US009216902B2

(12) United States Patent
Pinho et al.

(10) Patent No.: US 9,216,902 B2
(45) Date of Patent: Dec. 22, 2015

(54) METHOD FOR THE PRODUCTION OF ETHENE AND SYNTHESIS GAS IN CIRCULATING FLUIDIZED BED

(75) Inventors: Andrea de Rezende Pinho, Rio de Janeiro (BR); Fabio Leal Mendes, Rio de Janeiro (BR); Mauro Silva, Rio de Janeiro (BR); Keiji Maeshiro, Rio de Janeiro (BR); Antonio Wahib Bogossian Khalil, Rio de Janeiro (BR); Julio Amilcar Ramos Cabral, Rio de Janeiro (BR); Luis Fernando Soares de Azevedo, Rio de Janeiro (BR); Daniel Santos de Albuquerque, Rio de Janeiro (BR)

(73) Assignee: PETROLEO BRASILEIRO S.A. -PETROBRAS, Rio de Janeiro (BR)

( * ) Notice: Subject to any disclaimer, the term of this patent is extended or adjusted under 35 U.S.C. 154(b) by 709 days.

(21) Appl. No.: 12/585,214

(22) Filed: Sep. 8, 2009

(65) Prior Publication Data
US 2010/0058665 A1  Mar. 11, 2010

(30) Foreign Application Priority Data

Sep. 9, 2008  (BR) ...................................... 0804120

(51) Int. Cl.
*C01B 3/36* (2006.01)
*C01B 3/32* (2006.01)
*C01B 3/44* (2006.01)

(52) U.S. Cl.
CPC . *C01B 3/323* (2013.01); *C01B 3/44* (2013.01); *C01B 2203/0233* (2013.01); *C01B 2203/0283* (2013.01); *C01B 2203/0811* (2013.01); *C01B 2203/1005* (2013.01); *C01B 2203/1041* (2013.01); *C01B 2203/1047* (2013.01); *C01B 2203/1052* (2013.01); *C01B 2203/1058* (2013.01); *C01B 2203/1064* (2013.01); *C01B 2203/1076* (2013.01); *C01B 2203/1217* (2013.01); *C01B 2203/1229* (2013.01); *C01B 2203/1247* (2013.01)

(58) Field of Classification Search
CPC ........ C10G 11/00; C10G 11/02; C10G 11/04; C10G 11/05; C10G 11/06; C10G 11/08; C10G 11/10; C10G 11/12; C10G 11/14; C10G 11/16; C10G 11/18; C10G 11/182; C10G 11/185; C10G 11/187
See application file for complete search history.

(56) References Cited

U.S. PATENT DOCUMENTS

| | | | | | |
|---|---|---|---|---|---|
| 4,387,043 | A | * | 6/1983 | Vickers | ................ C10G 11/182 208/164 |
| 5,877,368 | A | * | 3/1999 | Kiyama | .................... C07C 2/00 208/135 |
| 6,153,089 | A | * | 11/2000 | Das | ........................ C10G 11/05 208/120.01 |
| 6,207,078 | B1 | | 3/2001 | Badano | |
| 6,222,087 | B1 | * | 4/2001 | Johnson | ................. C10G 11/05 208/114 |
| 7,763,165 | B1 | * | 7/2010 | Schultz | .................. C10G 11/05 208/113 |
| 2004/0014593 | A1 | * | 1/2004 | Le Van Mao | .......... B01J 21/066 502/71 |
| 2005/0038304 | A1 | * | 2/2005 | Van Egmond | ............ C07C 1/20 585/324 |
| 2006/0016725 | A1 | * | 1/2006 | Das | ........................ C10G 11/05 208/97 |
| 2006/0260981 | A1 | * | 11/2006 | Gosling | .......................... 208/59 |
| 2008/0081008 | A1 | * | 4/2008 | Choi | ....................... B01J 23/26 423/61 |
| 2008/0128325 | A1 | * | 6/2008 | Khan | ....................... B01J 23/10 208/67 |
| 2009/0126260 | A1 | * | 5/2009 | Aravanis et al. | ................. 44/308 |
| 2009/0158657 | A1 | * | 6/2009 | Hedrick | ................. B01J 8/1836 48/76 |
| 2009/0158662 | A1 | * | 6/2009 | Towler | ............................ 48/205 |
| 2009/0182184 | A1 | * | 7/2009 | Takamatsu | ............. B01J 29/068 585/651 |
| 2009/0264693 | A1 | * | 10/2009 | Xie | ...................... B01J 29/7615 585/650 |
| 2009/0293359 | A1 | * | 12/2009 | Simmons et al. | ............ 48/127.7 |

OTHER PUBLICATIONS

Batsita, et al, "Characterization of the activity and stability of supported cobalt catalysts for the steam reforming of ethanol" Journal of Power Sources, No. 124, (2003), pp. 99-103.
Haryanto et al. "Current Status of Hydrogen Production Techniques by Steam Reforming of Ethanol: A Review", Energy & Fuels, vol. 19 (2005), pp. 1098-2106.
Cavallaro et al. "Performance of Rh/Al$_2$O$_3$ Catalyst in the Steam Reforming of Ethanol: H$_2$ Production for MC", Applied Catalysis, vol. 249, No. 1 (2003), pp. 119-128.
Yamaguchi et al., Deactivation of ZSM-5 zeolite during catalytic steam cracking of n-hexane, Fuel Processing Technology 126 (2014) 343-349.
Golombok, Steam Hydrocarbon Cracking and Reforming, Journal of Chemical Education, vol. 81 No. 2, Feb. 2004.

* cited by examiner

*Primary Examiner* — Imran Akram
(74) *Attorney, Agent, or Firm* — Nixon & Vanderhye P.C.

(57) ABSTRACT

The present invention relates to a method for the production of ethene, CO, and hydrogen in a reactor with a circulating fluidized bed with two independent sections, from feedstocks that contain hydrocarbons with at least 11 carbon atoms or from feedstocks with a high oxygen content, using a catalyst in particulate form. The method teaches that in one of the sections of the reactor, in the absence of oxygen, a catalyst containing a dehydrogenation metal promotes the cracking of the said feedstocks, facilitating the subsequent endothermic reactions. In the other section, the coke is burned with air and the heating of the catalyst is controlled, for the adjustment of the appropriate amount of energy that the heated catalyst will convey to the section in which the endothermic reactions take place. The total ethene yield of the process according to the present invention is approximately 20% by weight in relation to the feedstock.

12 Claims, No Drawings

METHOD FOR THE PRODUCTION OF ETHENE AND SYNTHESIS GAS IN CIRCULATING FLUIDIZED BED

CROSS REFERENCE TO RELATED APPLICATION

This application is based upon, claims the benefit of, priority of, and incorporates by reference, the contents of Brazilian Patent Application No. PI 0804120-2 filed Sep. 9, 2008.

BACKGROUND OF THE INVENTION

Field of the Invention

The present invention lies within the field of catalytic cracking processes that take place in the presence of steam. More specifically, the invention relates to a method for the production of ethene and synthetic gas in a reactor with a circulating fluidized bed. The invention teaches that hydrocarbon feedstocks with at least 11 carbon atoms, or feedstocks consisting of raw materials with a high oxygen content, undergo pre-cracking upon coming into contact with a catalyst in the presence of steam and in the absence of oxygen. The burning of the coke deposited on the catalyst in another reaction bed enables the generation of the energy required for the endothermic reactions.

Foundations of the Invention

Hydrogen is widely used in refineries—particularly in the hydrogenation of streams of diesel oil and gasoline, or in the hydrocracking of residual streams—for the removal of sulfur or nitrogen compounds and for the manufacture of more noble and higher-quality derivative products.

Steam reforming makes it possible to produce hydrogen via the cracking of molecules with steam in the presence of catalysts. First the so-called "synthesis gas" (1) is produced:

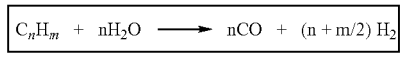
(1)

In the presence of an excess of steam, $CO_2$ is produced, as well as hydrogen (2):

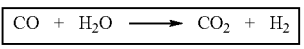
(2)

The reactor that is employed is a standard steam reforming converter that consists of a multi-tube furnace fed by a feedstock mixed with steam, into which a structured catalyst, based on $NiO$—$K_2O$, is inserted.

During the reforming, at a temperature of approximately 800° C., endothermic reactions occur that consume a large amount of energy. The heat necessary for the reactions is supplied via lateral blowpipes and is obtained through the burning of combustible gas.

The deposition of coke on the catalyst takes place more rapidly during the processing of heavier feedstocks. Consequently, early deactivation of the catalytic bed causes a drastic reduction in the production of synthesis gas. The feedstocks that are suitable for use in this process are limited to streams of light hydrocarbons. The most typical ones are natural gas, fuel gas or liquefied gas (LPG) [liquefied petroleum gas], and naphtha.

When the steam reforming process uses feedstocks with a high oxygen content (such as, for example, vegetable oils), the coking speed is correspondingly greater. Furthermore, relatively light raw materials, such as ethanol, are economically unfeasible. The literature on the continuous deposition of coke on the catalyst is fairly broad.

The publication by R. K. S. Santos entitled "*Caracterização e aplicação de catalisadores de cobalto suportados em gama $Al_2O_3$ e $SiO_2$ para produção de hidrogênio a partir da reforma a vapor e oxidativa de etanol*" ["Characterization and implementation of supported catalysts in the $Al_2O_3$ and $SiO_2$ range for the production of hydrogen via the steam-based and oxidative reformation of ethanol"] (Instituto de Química de São Carlos [St. Charles Chemistry Institute] (IQSC), master's thesis, São Carlos, 2006) indicates that the use of ethanol as a feedstock leads to coke deposition ranging from 2.7 mg/h to 12.7 mg/h per gram of catalyst.

The publication by Haryanto et al. entitled "*Current Status of Hydrogen Production Techniques by Steam Reforming of Ethanol: A Review*" (Energy & Fuels, Vol. 19 (2005), pp. 1098-2106) indicates, among other pertinent results, that nickel-based $Al_2O_3$-supported catalysts are deactivated after a few minutes.

The publication by Cavallaro et al. entitled "*Performance of $Rh/Al_2O_3$ Catalyst in the Steam Reforming of Ethanol: $H_2$ Production for MC*" (Applied Catalysis, Vol. 249, No. 1 (2003), pp. 119-128) describes the formation of 0.27 mg/h per gram of catalyst in $Al_2O_3$-supported rhodium catalysts.

U.S. Pat. No. 6,207,078 teaches that autothermic reforming is an alternative (albeit a weak one) for reducing the coking effect and reducing the total amount of energy consumed by the process.

The use of zeolites in the pentasyl family (such as ZSM-5) or of the faujasite type enables the breaking of the feedstock molecules beforehand, thus facilitating the later reactions and slowing the deposition of coke. The reforming reactions take place in the presence of supported metals, such as nickel, copper, iron, zinc, cobalt, cerium, manganese, and magnesium, or metal oxides or supported metal oxides, such as oxides of zinc and cobalt supported on alumina, rhodium oxide supported on alumina, and nickel oxide supported on gamma- or alpha-alumina or on silica.

SUMMARY OF THE INVENTION

The present invention teaches a method for the production of ethene and synthesis gas from raw materials that contain heavy hydrocarbons, such as kerosene, gas-oil, and fuel oil, or from raw materials with a high oxygen content, such as alcohols, vegetable oils, and ligno-cellulosic materials, such as sugar-cane bagasse, sugar-cane straw, and wood shavings, the latter of which are particularly important, because they are obtained from renewable raw materials.

Functioning in the same way as in cracking units, the catalysts promote the breaking of long chains and the formation of gasoline and light olefins. The steam reforming catalyst is continuously regenerated via the use of interconnected circulating fluidized beds (CFBs), in order to avoid deactivation due to coking of the catalytic bed. These converters have two different reaction environments that are isolated by catalytic seals located between the reaction environments. Steam-based catalytic cracking takes place via endothermic reactions in one of the environments and in the absence of oxygen, while, simultaneously in the second environment, the catalyst is continuously regenerated through the combustion of the coke with air.

Thus, the burning of the coke heats the catalyst in an independent section and, thanks to the circulation of this heated catalyst, allows an amount of energy suitable for the endothermic reactions to be conveyed from the second section to the first section.

Thus, the present invention relates to a method for the production of ethene, CO, and hydrogen in interconnected circulating fluidized beds, from feedstocks that contain hydrocarbons with at least 11 carbon atoms or from feedstocks with a high oxygen content, using a catalyst in particulate form.

More specifically, the invention relates to the generation of ethene and synthesis gas in reactors with interconnected circulating fluidized beds, in which raw materials that include hydrocarbons with at least 11 carbon atoms or raw materials with a high oxygen content are placed in contact with a catalyst, in the presence of steam and in the absence of oxygen.

The total ethene yield of the process according to the present invention is approximately 20% by weight in relation to the feedstock.

DETAILED DESCRIPTION OF THE INVENTION

The present invention provides a method for the production of ethene and synthesis gas in a reactor with two independent sections and a circulating fluidized bed, which method includes the following stages:

1) The provision of a feedstock of hydrocarbons or of a raw material with a high oxygen content;
2) The promotion of contact between the said feedstock and a catalyst such that steam-based cracking reactions take place in the first section of the reactor;
3) The separation of the resulting products;
4) The continuous regeneration of the said catalyst in the second section of the reactor, through the burning of the deposited coke with air;
5) The reconveyance of the said regenerated catalyst to the first section of the reactor, to restart the process.

The composition of the hydrocarbon feedstock must include molecules with at least 11 carbon atoms, and the renewable raw material must have a high oxygen content.

The steam-based catalytic cracking of the said feedstocks involves high concentrations of solids in the fluidized bed. Therefore, the density of the bed must be between 150 kg/m$^3$ and 1800 kg/m$^3$.

Endothermic reactions take place in the first section of the reactor, in the absence of oxygen, in the presence of steam, at temperatures between 450° C. and 850° C., at pressures between 0.10 MPa and 0.45 MPa, and with a steam/feedstock ratio between 2:1 and 10:1.

The catalyst consists of microspheroidal particles whose average particle size is between 50 microns and 90 microns. The composition of the catalyst includes 0% to 60% by weight of solid acid, 0% to 50% by weight of alumina, and 0% to 40% by weight of silica, with the remainder consisting of kaolin.

The solid acid includes at least one zeolite, which may be a member of the pentasyl family, such as ZSM-5, or may be of the faujasite type.

The catalyst also includes at least one supported metal, such as nickel, copper, iron, zinc, cobalt, cerium, manganese, and magnesium, or at least one metal oxide or supported metal oxide, such as oxides of zinc and cobalt supported on alumina, rhodium oxide supported on alumina, and nickel oxide supported on gamma- or alpha-alumina or on silica.

In a preferred embodiment of the invention, the catalyst preferably consists of microspheroidal particles whose size is between 65 microns and 75 microns and whose composition includes from 0% to 20% by weight of solid acid, from 5% to 40% by weight of alumina, and from 5% to 25% by weight of silica, with the remainder consisting of kaolin.

EXAMPLES

Tables 1, 2, 3 and 4, respectively, present some of the characteristics of the catalysts and feedstocks employed in the tests that illustrate the present invention.

Example 1

Comparative example. This example shows the effect of the deactivation of the catalyst over a period of 4 hours of uninterrupted kerosene processing, using a single pilot unit and a commercial steam reforming catalyst. A reaction temperature of 728° C. was employed, with a 4:1 mass-base steam/kerosene ratio.

The unit was operated under pressure of 101 kPa. Table 5 shows the hydrogen yield loss (% by mass) in terms of the dry base over time.

TABLE 1

CATALYSTS USED IN THE CATALYTIC TESTS

| CATALYST | A | B | C | D |
|---|---|---|---|---|
| Composition: | | | | |
| Type of zeolite | Y + ZSM-5 | ZSM-5 | None | None |
| RE$_2$O$_3$, % wt. | 0.12 | 0.12 | 0.0 | 0.0 |
| Ni, % wt. | 1.1 | 0.1444 | 15.1558 | 13.0889 |
| Physical properties: | | | | |
| Surface area, m$^2$/g | 145.5 | 120.6 | 22.0 | 223.0 |
| Mesopore area, m$^2$/g | 48.2 | 71.9 | 20.3 | 200.0 |
| Apparent bulk density, kg/m$^3$ | 790 | 810 | 1160 | 1090 |
| Micropore volume, cm$^3$/g | 0.0440 | 0.0226 | 0.0007 | 0.0000 |
| Granulometric distribution: | | | | |
| d10%, microns | 25 | 27 | 29 | 35 |
| d50%, microns | 76 | 68 | 70 | 64 |

TABLE 2

ETHANOL USED AS A FEED IN THE CATALYTIC TESTS

| Characteristics: | FEED HYDRATED ETHANOL |
|---|---|
| Assay (volumetric percentage) | 95.0 |
| Density, g/cm$^3$ | 0.810 |

TABLE 3

GLYCEROL USED AS A FEED IN THE CATALYTIC TESTS

| Characteristics: | FEED GLYCEROL |
|---|---|
| Assay (volumetric percentage) | 99.5 |
| Density, g/cm$^3$ | 1.260 |

TABLE 4

KEROSENE USED AS A FEED IN THE CATALYTIC TESTS

| FEED | KEROSENE |
|---|---|
| Density, g/cm$^3$ | 0.8170 |
| Sulfur, % wt. | 0.118 |
| Carbon, % wt. | 87.7 |
| Hydrogen, % wt. | 13.7 |
| Nitrogen, % wt. | 0.0 |
| Simulated distillation: ASTM D 2887 | |
| IBP [initial boiling point] (° C.) | 113.2 |
| 10% by mass | 166.2 |
| 20% by mass | 182.6 |
| 30% by mass | 197.6 |
| 40% by mass | 206.2 |
| 50% by mass | 216.4 |
| 60% by mass | 224.6 |
| 70% by mass | 233.0 |

TABLE 5

HYDROGEN YIELD LOSS OVER TIME

| | Time (minutes) | | | | | | | | | |
|---|---|---|---|---|---|---|---|---|---|---|
| | 0 | 47 | 69 | 109 | 130 | 162 | 202 | 231 | 262 | 280 |
| H$_2$, % wt. | 0 | 3.32 | 3.27 | 3.43 | 3.24 | 2.90 | 2.70 | 2.73 | 2.68 | 2.63 |

Example 2

Comparative example. In this example a single DCR (Davison Circulating Riser) unit with an adiabatic reactor was used in an ascending-flow dragged bed (riser).

The pilot unit operated with nitrogen, for feedstock atomization and also during the stripping stage (that is, no steam was injected). In this case, all of the water in the reaction medium came solely from the reaction in which the ethanol, as the process feedstock, was dehydrated. The catalyst-to-hydrocarbon (CTH) ratio was adjusted by varying the temperature of the feedstock. Simulated distillation in compliance with the ASTM D 2887 method was performed so that the resulting hydrocarbons could be analyzed, and the gasoline and heavy hydrocarbon flows, as defined by the 220° C. cut-off point, were determined. Ethanol was introduced into the riser reactor, which used a catalyst-density fluidization regime on the order of 45 kg/m$^3$, so as to come into contact with catalyst "A".

Table 6 shows the process conditions and the product-yield results. The results show the ethene yield resulting from the dehydration of the ethanol, along with the absence of CO and CO$_2$, as well as with the extremely low hydrogen values obtained under these conditions.

Example 3

Table 7 shows the results obtained through the use of the method taught in the present invention. A single pilot unit was used that had two circulating fluidized beds that were interconnected so that the tests could be performed. The first bed was dedicated to the reforming reactions and the second bed was dedicated to the reactions consisting of the combustion of the coke with air. A stream of hydrated ethanol, whose properties are listed in Table 2, was injected into the first fluidized bed, along with a water stream using the catalysts listed in Table 1. The density in the reaction bed was between 500 and 1800 kg/m$^3$, and the water-to-ethanol ratio was between 4.0 and 6.1. The reaction temperature varied between 618° C. and 831° C. The results indicate the generation of hydrogen, CO, and CO$_2$, as well as the generation of ethene, which is extremely useful in the petrochemical industry.

In Test 3, which used catalyst "C", no ethene was generated. Instead, only hydrogen, CO, and CO$_2$ were generated.

TABLE 6

RESULTS OF THE CATALYTIC TESTS

| TESTS | 1 | 2 |
|---|---|---|
| Conditions: | | |
| Ethanol flow rate, g/h | 350.3 | 357.3 |
| Additional water flow rate, g/h | 0.0 | 0.0 |
| Reactor temperature, ° C. | 380 | 580 |
| Reactor pressure, kPa | 239 | 239 |
| Reaction-bed density, kg/m$^3$ | 45 | 45 |
| CTH ratio, wt/wt | 6.2 | 35.8 |
| Process yields, % wt. | | |
| Ethene C$_2$$^=$ | 53.9 | 57.1 |
| Ethane C$_2$ | 0.43 | 0.45 |
| Methane | 0.13 | 0.10 |
| CO$_2$ | 0.00 | 0.00 |
| CO | 0.00 | 0.00 |
| Hydrogen | 0.03 | 0.03 |
| Water | 38.6 | 38.8 |
| Light hydrocarbons (C$_3$-C$_4$) | 3.62 | 2.00 |
| C$_5$$^+$ | 2.99 | 1.17 |
| Coke | 0.32 | 0.38 |

Example 4

Likewise, Table 8 shows the results achieved through the use of the method taught in the present invention.

The tests were performed with the use of a single pilot unit with two circulating fluidized beds. The first bed was dedicated to the reforming reactions and the second bed was dedicated to the coke-combustion reactions. A stream of kerosene and a stream of water were injected respectively into the first fluidized bed, along with the catalysts listed in Table 1, so as to produce a density between 500 and 1800 kg/m$^3$ in the reaction bed and a water-to-kerosene mass ratio between 6.2 and 6.8. The reaction temperature varied between 727° C. and 823° C. The results indicate the generation of hydrogen, CO, and CO$_2$, as well as the generation of ethene.

TABLE 7

RESULTS OF THE CATALYTIC TESTS

| TEST | 1 | 2 | 3 | 4 |
|---|---|---|---|---|
| Conditions: | | | | |
| Catalyst | C | B | C | B |
| Reactor temperature, °C. | 618 | 793 | 713 | 831 |
| Ethanol flow rate, g/h | 40.3 | 35.4 | 46.0 | 36.4 |
| Additional water flow rate, g/h | 160.0 | 213.8 | 216.0 | 223.7 |
| Water/Feed mass ratio, g/g | 4.0 | 6.1 | 4.7 | 6.1 |
| Reactor pressure, kPa | 101 | 101 | 101 | 101 |
| Reaction-bed density, kg/m$^3$ | 1724 | 542 | 1720 | 540 |
| Process yields (dry base), % by weight: | | | | |
| Hydrogen | 10.97 | 3.57 | 11.62 | 5.58 |
| CO | 12.74 | 22.26 | 4.79 | 38.21 |
| $CO_2$ | 70.56 | 5.46 | 82.84 | 6.45 |
| Ethene | 0.00 | 44.26 | 0.05 | 30.72 |
| Ethane | 0.00 | 2.55 | 0.00 | 2.23 |
| Methane | 5.08 | 11.10 | 0.56 | 15.10 |
| Propene | 0.06 | 0.49 | 0.00 | 0.36 |
| Propane | 0.00 | 0.00 | 0.00 | 0.00 |
| Coke + $C_4^+$ | 0.59 | 10.30 | 0.14 | 1.36 |

TABLE 8

RESULTS OF THE CATALYTIC TESTS

| TEST | 1 | 2 | 3 | 4 |
|---|---|---|---|---|
| Conditions: | | | | |
| Catalyst | B | B | C | C |
| Reactor temperature, °C. | 767 | 823 | 727 | 774 |
| Kerosene flow rate, g/h | 33.5 | 35.8 | 36.3 | 40.6 |
| Additional water flow rate, g/h | 229.1 | 240.8 | 225.9 | 249.3 |
| Water/Feed mass ratio, g/g | 6.8 | 6.7 | 6.2 | 6.2 |
| Reactor pressure, kPa | 101 | 101 | 101 | 101 |
| Reaction-bed density, kg/m$^3$ | 542 | 541 | 1724 | 1690 |
| Process yields (dry base) (% by weight): | | | | |
| Hydrogen | 4.40 | 7.37 | 4.67 | 6.80 |
| CO | 15.29 | 35.50 | 4.22 | 13.31 |
| $CO_2$ | 4.58 | 8.57 | 23.79 | 40.85 |
| Ethene | 19.33 | 0.00 | 29.72 | 19.77 |
| Ethane | 1.90 | 1.02 | 2.43 | 1.84 |
| Methane | 21.14 | 22.22 | 18.63 | 12.30 |
| Propene | 1.38 | 0.00 | 8.02 | 0.00 |
| Propane | 0.00 | 0.00 | 0.18 | 0.00 |
| $C_4$ | 0.52 | 0.09 | 4.40 | 2.26 |
| Coke + $C_5^+$ | 31.46 | 25.23 | 3.94 | 2.89 |

Example 5

Likewise, Table 9 shows the results achieved through the use of the method taught in the present invention. The tests were performed with the use of a single pilot unit with two circulating fluidized beds. The first bed was dedicated to the reforming reactions and the second bed was dedicated to the coke-combustion reactions. A stream of glycerol and a stream of water were injected respectively into the first fluidized bed, along with catalyst D in Table 1, so as to produce a catalyst density between 340 and 430 kg/m$^3$ in the reaction bed and a water-to-glycerol mass ratio between 5.3 and 5.9. The reaction temperature varied between 483° C. and 647° C. The results indicate the generation of hydrogen, CO, and $CO_2$.

TABLE 9

RESULTS OF THE CATALYTIC TESTS

| TEST | 1 | 2 | 3 | 4 |
|---|---|---|---|---|
| Conditions: | | | | |
| Catalyst | D | D | D | D |
| Reactor temperature, °C. | 647 | 585 | 580 | 483 |
| Glycerol flow rate, g/h | 40.5 | 41.0 | 41.3 | 42.0 |
| Additional water flow rate, g/h | 237.0 | 218.6 | 238.4 | 239.8 |
| Water/Feed mass ratio, g/g | 5.9 | 5.3 | 5.8 | 5.7 |
| Reactor pressure, kPa | 101 | 101 | 101 | 101 |
| Reaction-bed density, kg/m$^3$ | 340 | 364 | 422 | 395 |
| Process yields (dry base) (% by weight): | | | | |
| Hydrogen | 9.0 | 8.8 | 8.9 | 8.2 |
| CO | 16.0 | 7.2 | 6.3 | 5.8 |
| $CO_2$ | 73.7 | 82.7 | 83.8 | 81.7 |
| Ethene | 0.0 | 0.0 | 0.0 | 0.0 |
| Ethane | 0.0 | 0.0 | 0.0 | 0.1 |
| Methane | 1.1 | 0.9 | 0.7 | 4.0 |
| $C_3$-$C_4$ | 0.0 | 0.0 | 0.0 | 0.0 |
| Coke + $C_5^+$ | 0.16 | 0.38 | 0.28 | 0.24 |

The invention claimed is:

1. Method for the production of ethene and synthesis gas in a circulating fluidized bed, the method including the following steps:
   1) providing a reactor with two independent, interconnected sections, each with a circulating fluidized bed;
   2) providing a feedstock, a water stream, and a steam cracking catalyst to a first section of the reactor in order to promote contact between said feedstock and the steam cracking catalyst at a temperature between 620° C. and 830° C. such that steam based cracking reactions occur in the presence of steam and the absence of oxygen;
   3) separating products from the steam based cracking reactions, wherein the products include ethene;
   4) continuously regenerating said catalyst in a second section of the reactor, through the burning, with air, of the deposited coke; and
   5) reconveying said regenerated catalyst to the first section of the reactor to restart the process;
   wherein the feedstock is a raw material selected from the group consisting of an oil of renewable origin, vegetable oil, an alcohol, a lignocellulosic material, and mixtures thereof; and
   wherein the steam cracking catalyst consisting of from 0 to 60% by weight of a solid acid including at least one zeolite, from 5 to 40% by weight of alumina, from 5 to 25% by weight of silica, kaolin, and at least one metal or metal oxide.

2. Method according to claim 1, wherein said feedstock of a raw material comprises a vegetable oil selected from the group consisting of castor oil, soy oil, cashew oil, cotton oil, peanut oil, and mixtures thereof.

3. Method according to claim 1, wherein said feedstock comprises an alcohol including ethanol.

4. Method according to claim 1, wherein said feedstock comprises a ligno-cellulosic material selected from the group consisting of sugar-cane straw, sugar-cane bagasse, wood shavings, wood sawdust, and mixtures thereof.

5. Method according to claim 1, wherein said zeolite comprises a pentasyl zeolite or a faujasite type zeolite.

6. Method according to claim 1, wherein said at least one metal or metal oxide includes at least one of the following metals: nickel, copper, iron, zinc, cobalt, cerium, rhodium, manganese, and magnesium and mixtures thereof.

7. Method according to claim 1, wherein said at least one metal or metal oxide is supported by an aluminum, silica, or magnesium substrate.

8. Method according to claim 1, wherein said at least one metal or metal oxide is in amount of from 0.5 to 20% wt based on the catalyst.

9. Method according to claim 1, wherein said catalyst includes microspheroidal particles whose average particle size is between 50 microns and 90 microns.

10. Method according to claim 1, wherein said circulating fluidized bed includes a percentage, ranging from 5% to 40%, of particles that are smaller than 40 microns and whose density is between 150 kg/m$^3$ and 1800 kg/m$^3$.

11. Method according to claim 1, wherein said steam-based cracking reactions take place at a pressure between 0.10 MPa and 0.45 MPa with a steam/feedstock mass ratio between 2:1 and 10:1.

12. Method according to claim 1, wherein said steam is at a temperature between 300° C. and 1000° C., with the goal of keeping the catalytic bed heated and helping to maintain the thermal equilibrium of the converter.

\* \* \* \* \*